(12) United States Patent
Steinich et al.

(10) Patent No.: US 7,746,066 B2
(45) Date of Patent: Jun. 29, 2010

(54) POSITION SENSOR

(76) Inventors: Klaus Manfred Steinich, Goethestraβe 8, 85604 Zorneding (DE); Peter Wirth, Pater-Ruppert-Mayer-Strasse 7, 85386 Eching (DE)

( * ) Notice: Subject to any disclaimer, the term of this patent is extended or adjusted under 35 U.S.C. 154(b) by 157 days.

(21) Appl. No.: 11/990,733

(22) PCT Filed: Aug. 18, 2006

(86) PCT No.: PCT/EP2006/065466

§ 371 (c)(1),
(2), (4) Date: Feb. 19, 2008

(87) PCT Pub. No.: WO2007/023139

PCT Pub. Date: Mar. 1, 2007

(65) Prior Publication Data

US 2009/0146645 A1    Jun. 11, 2009

(30) Foreign Application Priority Data

Aug. 22, 2005   (DE)   ................... 10 2005 039 662

(51) Int. Cl.
*G01B 7/14*     (2006.01)
*G01R 33/02*    (2006.01)

(52) U.S. Cl. ...................... 324/207.13; 324/207.24
(58) Field of Classification Search ............ 324/207.13, 324/207.24
See application file for complete search history.

(56) References Cited

U.S. PATENT DOCUMENTS

| 3,898,555 | A   |   | 8/1975  | Tellerman |
|-----------|-----|---|---------|-----------|
| 5,570,326 | A   |   | 10/1996 | Trystram  |
| 6,369,563 | B1  | * | 4/2002  | Krahe et al. ........... 324/207.13 |
| 6,479,986 | B1  |   | 11/2002 | Steinich et al. |
| 6,501,263 | B1  |   | 12/2002 | Nyce |
| 6,577,691 | B2  | * | 6/2003  | Richards et al. ............ 375/355 |

FOREIGN PATENT DOCUMENTS

| DE | 19703633 A1 | 8/1998 |
|----|-------------|--------|
| DE | 19703633 C2 | 12/2002 |
| DE | 69627536 T2 | 8/2004 |
| EP | 0885373     | 6/1998 |
| WO | WO98/27401  | 6/1998 |

* cited by examiner

*Primary Examiner*—Reena Aurora
(74) *Attorney, Agent, or Firm*—Head, Johnson & Kachigian, P.C.

(57) ABSTRACT

In order to be able to perform a measurement of the run time of an electrical impulse in a position sensor through a single slow timed timing generator, while still capable to achieve a high precision of the measurement result, the entire run time is determined, so that the number of the completely performed system timings is counted as a coarse time value, and the fractions thereof are counted as a fine time value, in which the electrical impulse is started at a fixed point in time of the system timing, e.g. at the beginning of the timing, and the difference value is measured between the end of the coarse time interval and the arrival of the wave as a fine time interval, which is then digitized and computed with the coarse time value.

18 Claims, 8 Drawing Sheets

POSITION SENSOR

CROSS-REFERENCE TO RELATED APPLICATIONS

This application is the United States National Phase of PCT/EP2006/065466 filed 18 Aug. 2006 which claims priority to German Patent Application No. 102005039662.3 filed 22 Aug. 2005.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

INCORPORATED-BY-REFERENCE OF MATERIAL SUBMITTED ON A COMPACT DISC

Not Applicable

BACKGROUND OF THE INVENTION (1) Field of the Invention

The invention relates to a magnetostrictive position sensor and to a method for its operation.

(2) Description of the Related Art

In a magnetostrictive position sensor a magnetostrictive and electrically conductive wave conductor extends along the measuring range relative to which the position of the position indicator is to be determined. The position indicator is particularly a permanent magnet.

As it is well known, the position is determined through an electrical impulse being imparted into the wave conductor from an input position, which generates a mechanical-elastic wave at the position of the magnetic position indicator through its magnetic field, which propagates from the position of the position indicator along the wave conductor, also in the direction of a measurement location on the wave conductor, typically one end of the wave conductor.

Through the measurement of the time interval between imparting the electrical impulse at the input position—which is typically identical with the measurement location—and the arrival of the mechanical-elastic wave at the measurement location, which is converted into an electrical impulse at this location, from the runtime—thus the sum of the run time of the electrical impulse to the position indicator and the reverse runtime of the mechanical-elastic wave to the measurement location—in consideration of the known propagation speed of the electrical impulse, as well as of the mechanical-elastic wave along the wave conductor, the distance of the position indicator from the measurement location, and thus the position of the position indicator relative to the wave conductor, and thus also relative to the entire positions sensor can be determined, and thus with an accuracy in the single digit the μ-meter range.

It is already known from the basic patent with respect to the magnetostrictive position determination (U.S. Pat. No. 3,898,555A by Tellerman) to determine the time interval through a clock, timed in the MHz range, for example a quartz clock, by counting the number of cycle periods digitally. The more precise the position determination has to be performed, the higher the resolution of the timing of the clock has to be, which is used for time measurement.

The faster the timing of such time measurement unit, the higher is also the energy consumption and the generation of heat, especially when the fast timed time measurement unit is to run for the entire duration to be measured, thus from the start impulse to the stop impulse. Since energy consumption as well as the generation of heat generated thereby in the electronic components is disadvantageous for the measurement result, it is attempted to avoid this effect.

For this purpose, it is suggested in the EP 0885373B by the MTS company to use the so-called SARA-assembly to measure the time interval to be measured through a coarsely timed coarse clock, operating in the MHz range, and to measure the fine time difference resulting from the integer periods of the coarse clock and the time interval to be actually measured, with a fine timing device, timed faster and operating in the GHz range, and to compute the total time from the coarse time value and the fine time value.

Supposedly, this has the advantage that the fine timing device has to run only during the substantially smaller residual time interval and not during the entire measuring time interval, and thus its resultant energy consumption and the generation of heat in the processing electronics is minimized.

In this publication, the coarse counter is only started at the beginning of the time interval to be measured, which is a disadvantage, since the transient response of the coarse counter at start-up induces imprecision's into the measurement result.

From the DE 19703633C patent, it is known to provide a system timing for the purpose of coarse counting, which is already active before the beginning of the time interval to be measured, and which runs in particular for the whole operating duration of a respective position measuring device.

This, however, is causing the disadvantage that at the beginning and also at the end of the entire measuring time interval residual times with a duration below one period of the system timing of the coarse time remain, which need to be determined, which, in this state of the art document, is done through charging capacitors, whose charging state reached during the residual times is determined analogue and converted into a fine time value.

Thereby, a fine time clock, which is timed faster than the relatively coarse system timing, can be completely dispensed with. However, the complexity to determine the total time is relatively high with respect to the computation effort and also with respect to the respective device.

BRIEF SUMMARY OF THE INVENTION

Therefore, it is the object of the present invention to perform the position determination of a magnetic position sensor with only one timed clock, whose timing is relatively slow in relation to the desired accuracy of the position determination, and which still keeps the complexity of the hardware and the computation effort for the position determination at a minimum.

The moment, at which the magnetostrictive position determination has to be performed, is typically broadly predetermined by the application in which this method is used. However, for the exact selection of the measurement time, there normally is a certain time window available, even though this is only in the range of $1/100^{th}$ of a second.

However, this is sufficient to place the beginning of the measuring sequence, thus the initiation of the electrical start impulse, inside such a time window to an exactly defined point in time of a period of the basic system timing for this application, for example of the rising edge of a particularly digital system timing.

A precondition for this is that the period of the system timing is shorter than the available time window, which however, is generally the case with a frequency of the system timing in the MHz range.

The beginning of the time interval to be measured thus already coincides e.g. with the beginning of a period of the system timing.

Thus, a coarse time interval can be determined by counting the number of completed periods of the system timing, wherein this coarse time interval has to be correlated in some known and defined form, with the time interval to be measured between start and stop impulse.

This correlation can, for example, occur so that the coarse time value is determined through counting the completed periods of the system timing since the occurrence of the start impulse, which coincided for example with the beginning of a period and ends with the next end of a period of the system timing after the occurrence of the stop impulse, or it ends with the end after the next of such a period after the occurrence of the stop impulse, which typically does not coincide exactly with the beginning, or the end of such a period.

The difference in time value, the so called fine time value, between the actual occurrence of the stop impulse and the defined, chosen, however with the occurrence of the stop impulse defined and correlated, end of the coarse time value, is determined analogue, digitized and computed with the coarse time value, thus in this example subtracted from the coarse time value to determine the exact duration of the time interval, thus the sum of the runtimes of the electrical impulse and of the returning of the mechanical-elastic wave.

On the one hand, besides the coarse time value to be digitally determined in a simple manner, only a single fine time value has to be determined and computed therewith.

Through the analogue determination of the fine time value no timing clock is required, which is timed as fast or faster than the desired resolution for the total time determination.

Through the free selection of the correlation of the coarse time interval with the time interval to be measured, thus in particular the selection of the end of the coarse time interval as soon as possible after the occurrence of the stop impulse, it can be accomplished that the analog determination of the fine time value is possible with simple and cost effective means, but can still be performed with very high precision.

Through providing the system timing already before the start impulse it is accomplished that the system timing is already completely tuned when the start impulse is initiated. A transient response of the system timing, possibly occurring when initiating the system timing through the start impulse, which could falsify the achieved coarse time value, is thus avoided.

By concluding from the run time sum to the distance of the magnetic position indicator from the measurement location in consideration of the specific velocities of the electrical excitation impulse and also of the mechanical-elastically wave, a very precise of the determination of the position indicator is accomplished. Thus, considering the run time of the electrical excitation impulse is only useful due to the much higher velocity relative to the velocity of the mechanical-electrical wave, when the sum of the run time is determined with a precision of $1/1000$ of a second, and the distance between the position indicator and the processing location is at least 30 cm, since otherwise the singular effects, like e.g. conversion time of the electrical excitation impulse into a magnetic elastic wave, reaction times of the processing circuit, etc. influence the result too much.

The fine time value of the supplemental time interval is determined through determination of an analog electrical value, e.g. of one or two associated electrical voltage values, and thus preferably through interpolation to the respective point in time of the stop impulse between the beginning and the end of an auxiliary time interval, which corresponds to an entire period of the system timing or to an integer multiple thereof. As an interpolation method e.g. the integration of an electrical parameter, which is constant as possible over the time of the occurrence of the stop impulse and the end of the coarse time interval, is used.

The integration is thus started with the occurrence of the stop impulse and it is ended through the end of the coarse time interval. For such interpolations and integrations known methods are available, and for the circuit implementation only few simple electrical components are required.

Thus, for fine time measurement typically a capacitor or an RC member is used, which are charged during the supplementary interval, and whose charging state is measured analog at the end of the supplemental interval, and the duration of the supplemental time interval and thus the fine time value can be determined there from.

The precision of the determination of the fine time value will be very high in spite of the analog determination method, when the electrical element used for the fine time measurement is calibrated before each position determination. When the available system timing is used for the calibration directly, then no additional circuit effort is required for predetermining a calibration time period.

Since the charge curve e.g. of a capacitor is not a straight line, it is advantageous, not to terminate the coarse time interval immediately with the occurrence of the next beginning of a period of the system timing after the stop impulse, but later by at least one period of the system timing. Thereby the supplemental time interval becomes longer, the differences between the particular time intervals to be determined in different measurement processes thereby become smaller in relation to the total time of the supplemental time interval on a percent basis.

Thereby, it is possible to approximate the non-linear charge curve of a capacitor arithmetically through a straight line, since the approximation errors compared to the actual graph of the charge curve become smaller and smaller with increasing length of the supplemental time interval.

Thus, it is possible to determine the charge value, e.g. of the capacitor, or of the RC component, which occurs after a charge time of the length of the calibration time interval, which has a defined length, which in particular amounts to the single, 1.5 fold, or integer multiple of the system timing.

Thereafter, it can be inferred in approximation that the charge from the beginning of the charge time period to the end of the calibration time interval increases in a linear manner and thus the charge value determined at the end of the time interval (measured in Coulomb) can be easily computed with little error into a time duration of the supplemental time interval.

Another possibility is to perform the fine time measurement through 2 analog, phase shifted, sinusoidal voltages, whose phase position, also relative of the system timing, is known. Through determining the voltage value and the prefix of both voltages upon occurrence of the stop signal, the phase position of both voltages can be determined in an unambiguous manner, and thus a time duration since the beginning of the preceding period beginning of the system timing, or as a difference value, the fine time value e.g. up to the beginning of the next system timing after the next, thus e.g. up onto the end of the coarse time interval can be determined.

Preferably thus the period duration of the sine voltage exactly corresponds to the length of the period of the system timing, or to an integer multiple thereof, which facilitates the computation of the supplemental time interval, and also the selection of a calibration time interval for the capacitor, or the RC component in correspondence with a period of the system timing, or a multiple thereof, reduces the processing effort.

A constant voltage or a constant current is thus provided to the RC component for integration through a switch, over which the integration is performed, and in particular a such capacitor or RC component is selected, whose charge time is equal or larger than a time interval of 2 periods of the system timing, and which has a correspondingly small integration time constant, so that the time interval can be determined to $\frac{1}{100}$ of the calibration time interval.

At a selected frequency of the system timing in the MHz, thus e.g. 10 MHz, the time interval can be determined with a precision of $0.1 \times 10^8$ s.

Thus, a very simple construction of a highly precise position sensor can be accomplished, which comprises as mechanical elements, as it is typical besides the wave conductor, also the position sensor and as signal electronics besides an excitation circuit and a system timing clock, only one single interpolator for fine time determination besides a coarse counter.

BRIEF DESCRIPTION OF THE DRAWINGS

Embodiments according to the invention are subsequently described in more detail in an exemplary manner.

FIG. 2b illustrates in detail some partial circuits as shown in FIG. 2a.

DETAILED DESCRIPTION OF THE INVENTION

Figure 1:
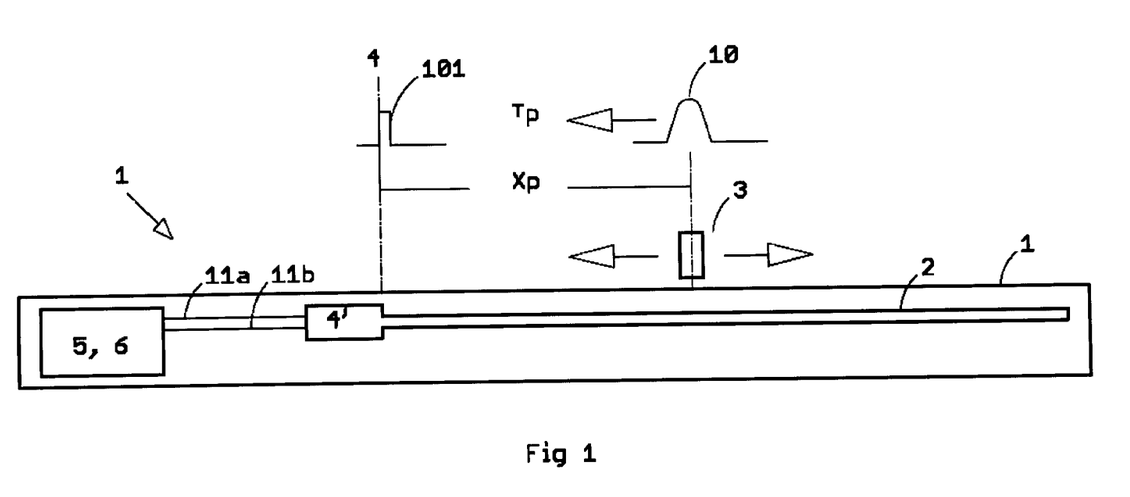
FIG. 1 shows a position sensor according to the invention.

In FIG. 1 the entire position sensor 1 is shown. As it is known, a wave conductor 2 extends along the measurement range, along which also the positions indicator 3, typically in the form of a magnet can be moved back and forth, whose position relative to the measurement location 4, which is disposed at a defined position on the wave conductor 2, typically at its beginning, shall be determined.

The measurement location 4 is also in this case disposed here at the beginning of the wave conductor 2, and from here the start impulse 101 is imparted upon the wave conductor through the excitation circuit 6, and also the mechanical-elastic wave resulting therefrom at the position of the position indicator 3 is detected through the impulse detector 4' with respect to its impact time and both is transmitted through electrical conductors 11a,b to the signal electronics 5 for determining the run time sum 100 (sum of the run time of the excitation current from the measurement location 4 to the location of the position indicator 3, and run time of the mechanical elastic wave from the location of the position indicator 3 to the processing location 4).

Figure 2A:
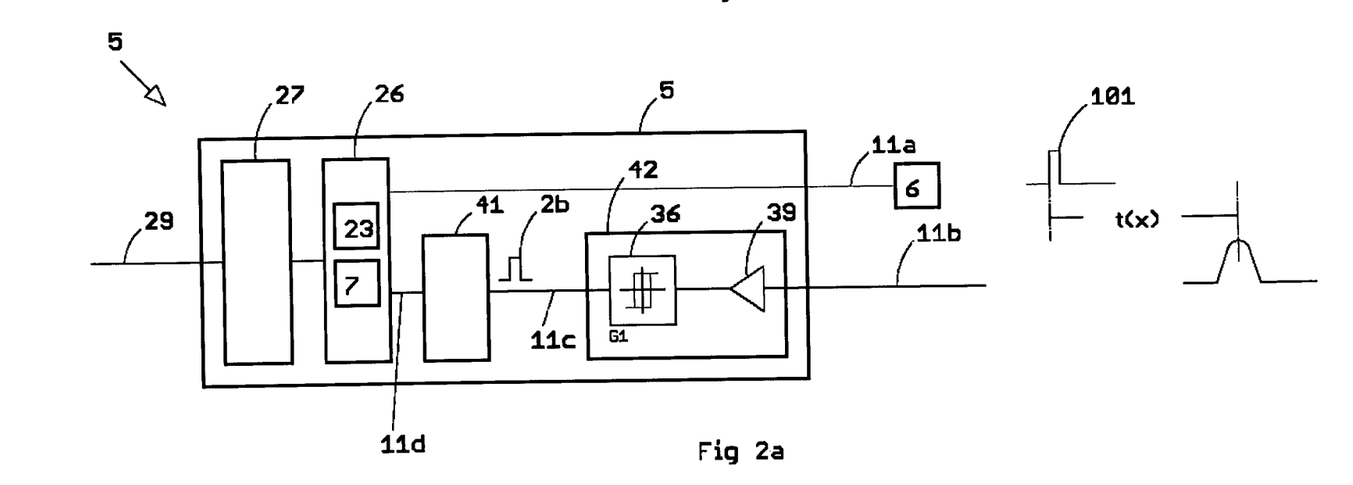
FIG. 2a shows a block diagram of the signal electronics.

According to FIG. 2a, this is performed through imparting the start impulse 101 through a conductor 11a directly to an arithmetic unit 26 within the signal electronics 5, among other things comprising the coarse counter 23, while the analog position signal on the conductor 11b is converted through a threshold value circuit 42, in which the analog signal initially runs through an amplifier 39 and subsequently through a comparator 36, into a binary position impulse, which is provided to an integrator circuit 41 through the conductor 11c.

Said integrator circuit is also connected with the arithmetic unit 26, which performs the computation between the coarse and the fine time value and provides it to the interface 27 in the form of a standardized position value, wherein the interface generates the output signal 29.

Figure 3A:
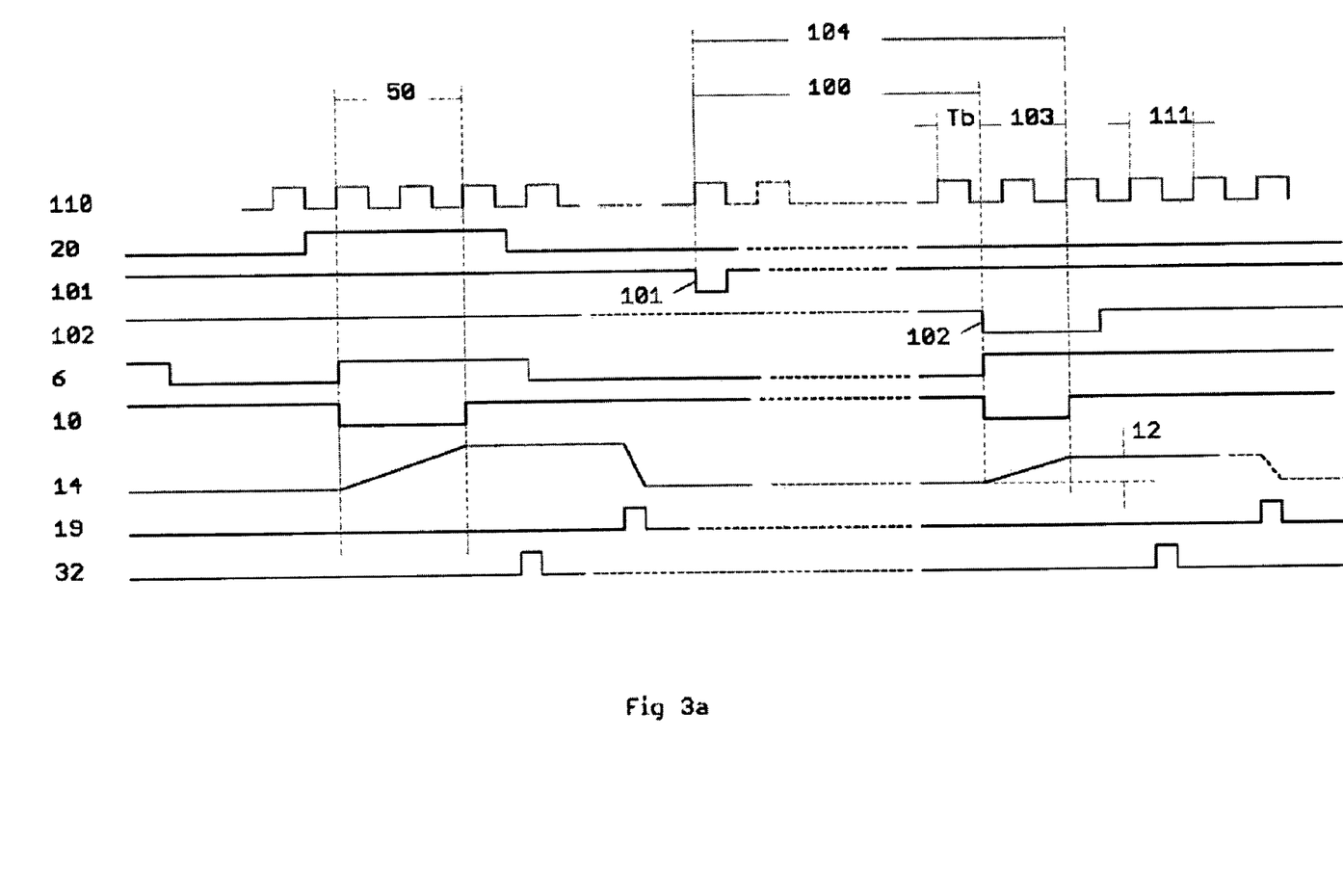
FIG. 3a show the occurring signal graphs in comparison.

Thus FIG. 3a shows the associated signal diagrams.

The system timing 110, which is generated by an excitation circuit, is provided to the signal electronics 5 in the form of a rectangular digital signal.

Each period 111 of this system timing is begun according to definition, e.g. through a rising flank of the signal, and it ends with the next rising flank of the signal.

At the beginning of such a period a start impulse 101 is imparted upon the wave conductor 2 at the measurement location 4, and simultaneously constitutes the start impulse for the beginning of the run time sum 100 to be measured, and thus also to the beginning of the coarse time interval 104.

As a reaction, the wave 10 arriving subsequently at the measurement location 4, is converted into an electrical stop impulse 102, which on the one hand initiates the beginning of the fine time measurement, and simultaneously ends the coarse time interval 104 at the next period beginning of the system timing 110, or at the subsequent period beginning, whereby also the supplemental time interval 103 is stopped.

A coarse count value representing the coarse time interval 104 is now available in the form of an integer number of periods 111 elapsed during the coarse time interval 104.

A fine time value is now available in the form of the analog charge value, e.g. a voltage value 12 or a Coulomb value, up to which the capacitor has been charged during the supplemental time interval 103.

Figure 2B:
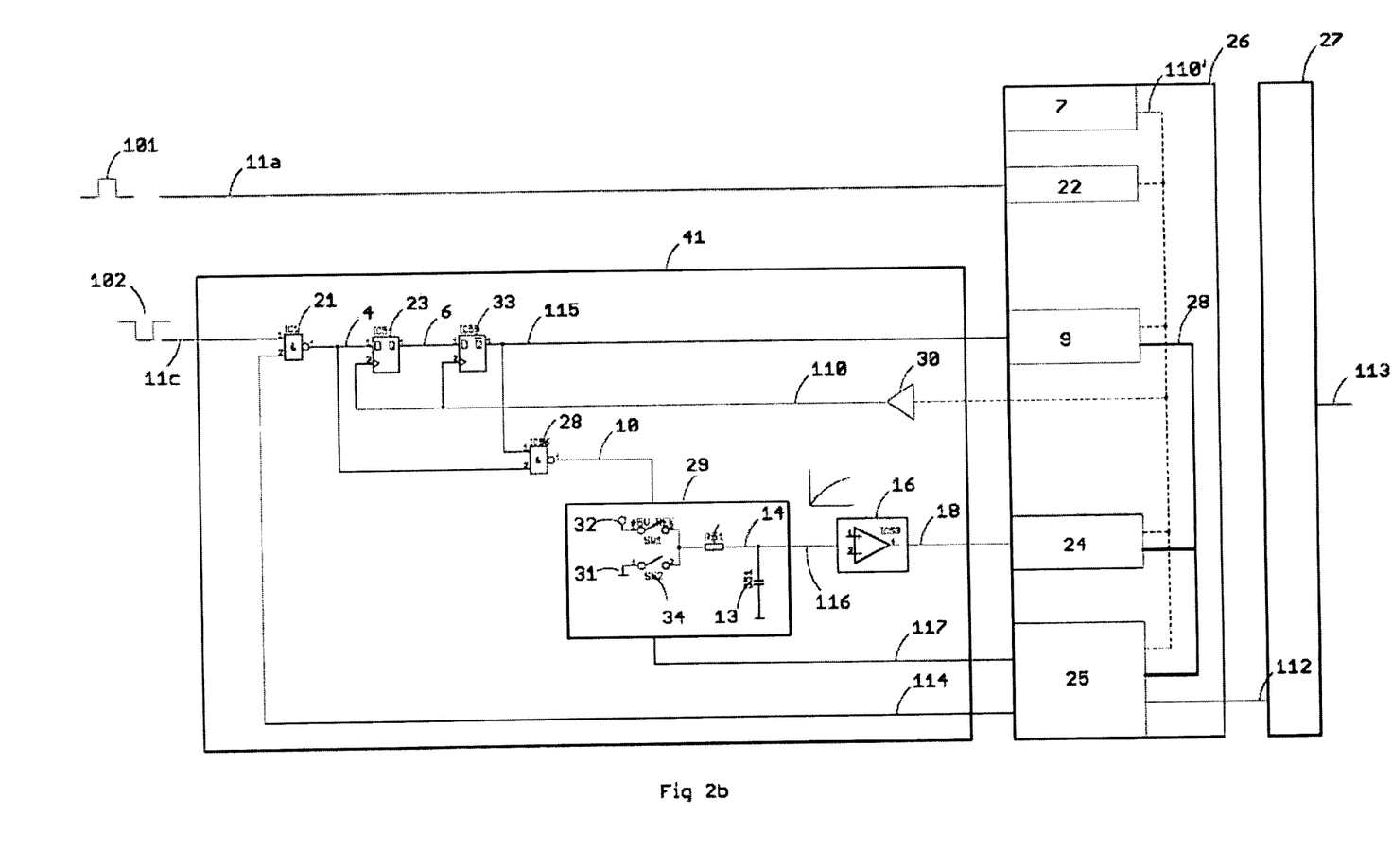
Figure 2C:
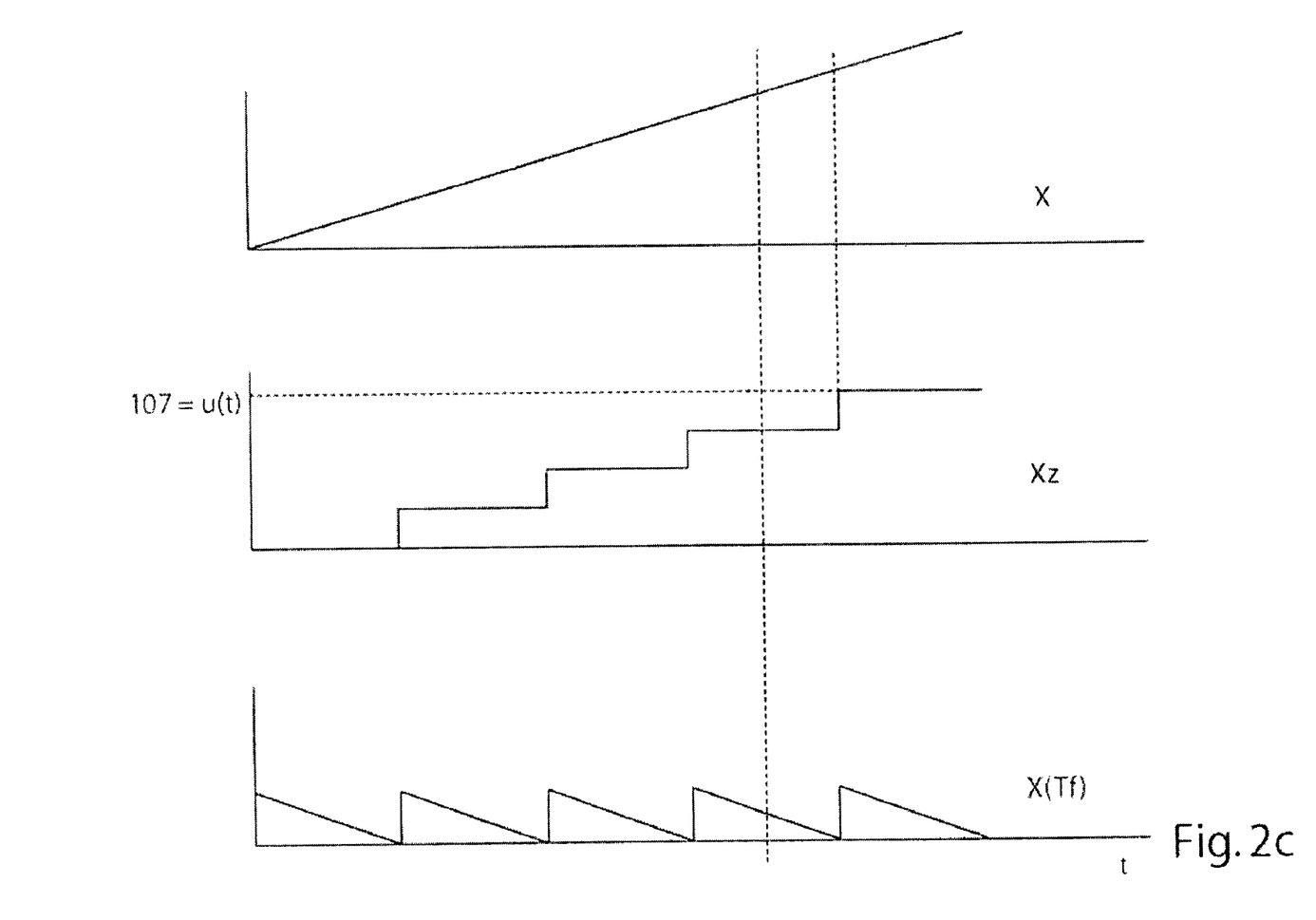
FIG. 2c shows exemplary signal graphs for the coarse and the fine counter.

FIG. 2c shows in the context the period wise compounding digital coarse count value 107 of the coarse counter 9, and the analog fine count value 108, which begins to rise from the beginning of the supplemental time interval 103 up to the end of the supplemental time interval 103, which is simultaneously the end of the coarse time interval 104.

Figure 4A:
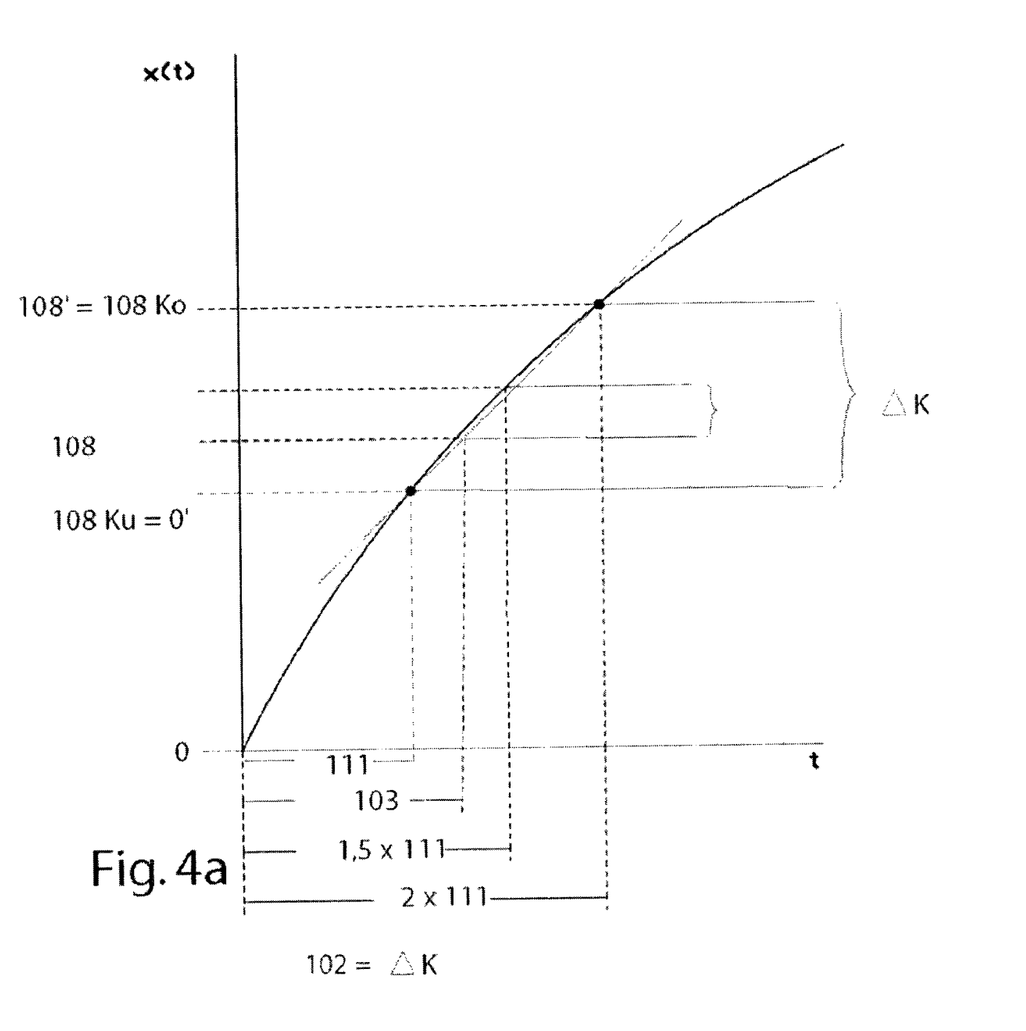
FIG. 4 shows methods for fine time determination.

The fine time value 108 (Re. FIG. 4), is e.g. the voltage value of a capacitor 13 which said capacitor has, when it is charged with a constant charge current or a constant charge voltage from a defined initial state, mostly the discharged state, over the time to be measured, in this case the supplemental time interval 103.

The coarse time interval 104 and the supplemental time interval 103 can also end at different points in time, e.g. the ends of different periods of the system timing, but the time difference of the two endings has to be known.

In order to be able to determine the elapsed supplemental time 103 therefrom, this capacitor 13 is calibrated directly before the measurement run, in particular before each measurement run by determining through a defined calibration interval, e.g. two periods 111 long, charging it beginning with the same charge current and with the initial state, and thus the determined calibration voltage 108.

The fine count value 108 resulting from the determination of the supplemental interval 103 in the form e.g. of a voltage signal is referenced to the calibration voltage 108K', wherein the deviation between the actual charge curve and the assumed linear increase of the voltage depending on the time between the lower and upper limit 108Ku, 108Ko of the calibration time is neglected.

In the practical application this can be realized in a different manner. Thus typically initially the charge time of the used capacitor or the RC component has to be calibrated over a known time period, the calibration time interval ΔK. Since the subsequent fine time measurement shall be performed over an interval range of one to two periods of 111 of the system timing (in time frames below a system period, meta stable limit conditions can occur), in case of a first method two separate calibration values are determined, thus a lower calibration value 108Ku, as it occurs after the lapse of an entire system period 111, and an upper calibration value 108Ko, as it occurs after the lapse of the time of the two system periods 111.

Instead of the actual non linear graph between the zero point and the end point of the calibration at 108k', a linear graph through the two points 108Ko and 108Ku is assumed.

In the subsequent measurement of the time interval 103, e.g. through an A/D converter initially the uncalibrated fine time value 108 (with the help of this assumed straight graph and its intersection point) is determined at the end of the supplemental time interval 103.

This value determination can still be increased in its precision by subtracting the voltage value corresponding to an entire period or several entire periods from the absolute value of the calibration time interval ΔK and the still analog fine time value 108, which leads to a movement of the zero level of the voltage U to a new fictitious zero point 0'.

In addition, the actual measuring range thus created from the new zero point 0' to the end of the next period of the system timing is stretched by a factor, e.g. the factor 4, whereby the resolution for the unchanged number of digital numbers of this voltage range becomes higher, and thus the precision of the time interval to be digitized is increased.

Additionally, the still uncalibrated fine time value 108 is put in relation with the calibration time interval ΔK, which is known with respect to its absolute value, and thereby standardized.

The run time sum can thus be determined through subtracting the standardized fine time value 108 from the digital coarse count value 107, wherein the addition of the single period duration 111, which was left out through the zero point shift, must not be omitted as a coarse count value.

Another method is determining the absolute value of the middle of this calibration time interval after 1.5 system periods 111, instead of the determination of the upper limit and the lower limit of the calibration time interval 108Ku and 108Ko after the lapse of one entire, or two entire system periods 111, and from there to determine through subtracting and adding of a calibration interval (ΔK) divided by 2, which is known due to the component used, again the absolute limits of the calibration time interval, and thereafter to perform the determination of the fine time value 108 as described.

Instead of a charge building up at the beginning of the supplementary time interval 103, also a declining charge can be used, e.g. through charging the capacitor at the beginning of each period 111 of the system timing 101 to a fixed value and having it drop by the end of the period to a known value, as shown based on the fine time value 108" in FIG. 2c.

This has the advantage that the fine time value 108 of the capacitor can be directly measured when the stop impulse 102 occurs, and it can already be processed during the duration of the supplemental time interval 103.

Figure 5:
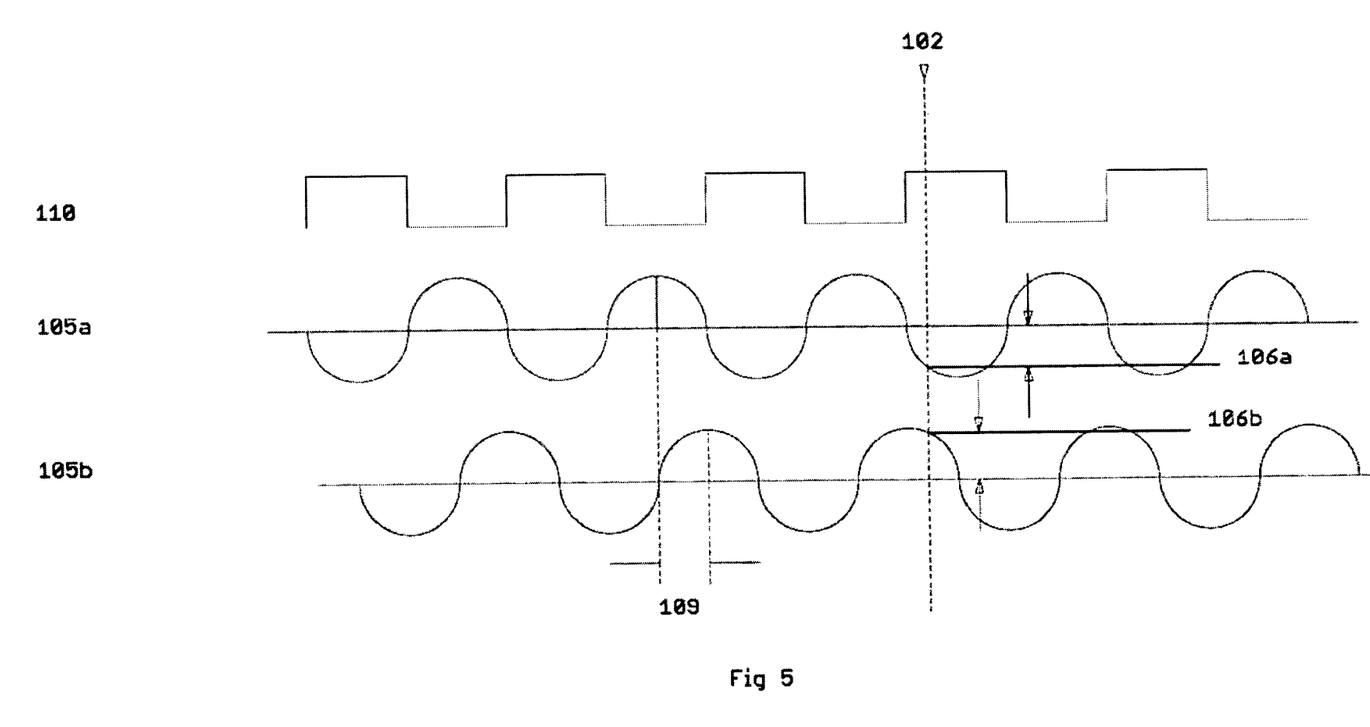
FIG. 5 illustrates another method for fine time determination.

FIG. 5 shows another method of the determination of an analog voltage value 106a, b:

Two sinusoidal voltages 105a, b are disposed with a phrase difference 109 of e.g. 90°. The phase difference to the system timing 110 is also known, since e.g. the one sinusoidal voltage 105a runs synchronous or anti synchronous to the system timing 110. Preferably the two voltages do not only have the same frequencies relative to each other, but also the same frequency as the system timing 110, or an integer multiple thereof.

When the stop result 102 occurs, the momentary voltage values 106a and 106b of the two sinusoidal voltage graphs 105 a,b are determined, thus with respect to their absolute values, and also with respect to their prefixes. Due to the knowledge of the phase position, the elapsed time since the beginning of the last period 111 of the system timing can be calculated for both voltage graphs 105 a, b, and thus also the difference time until the next, or each desired additional beginning of the period 111, and thus up to the end of the coarse time interval 104.

Figure 4B:
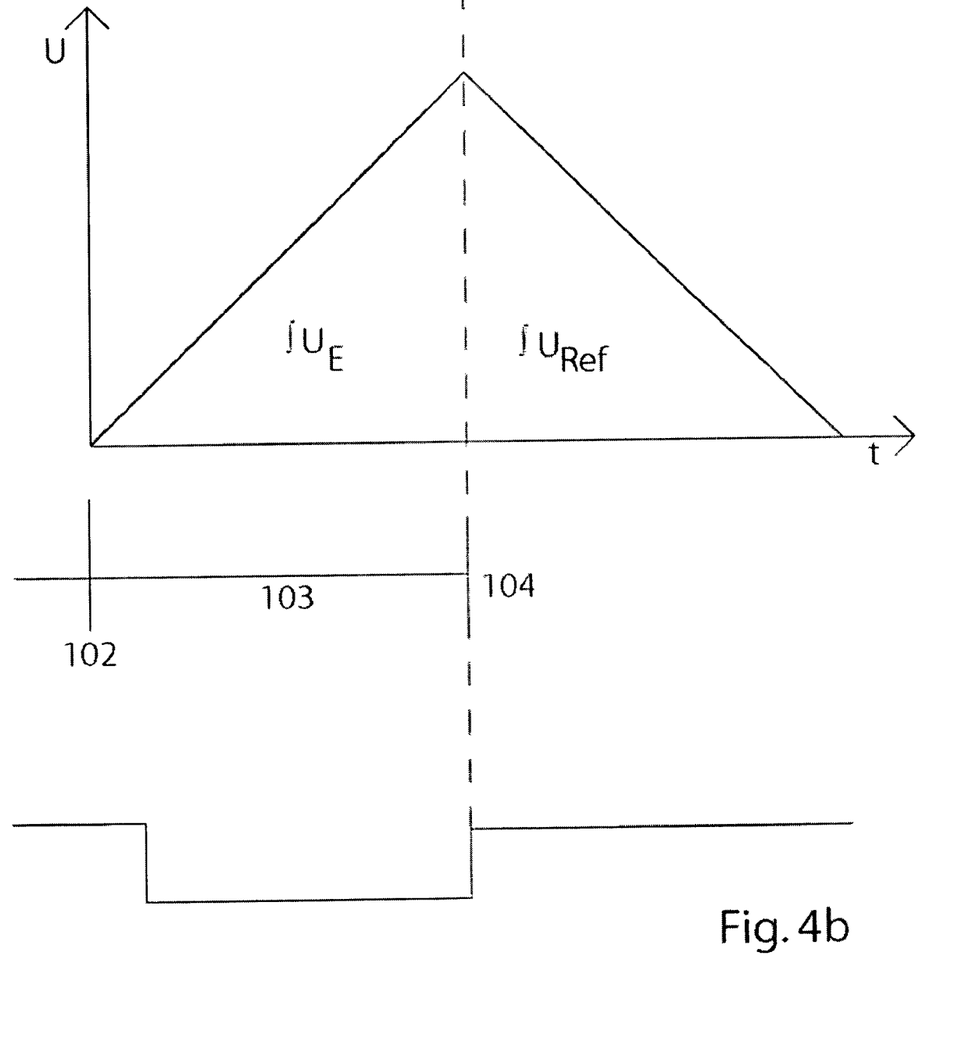

FIG. 4b shows the fine time measurement through the dual slope method as a third possibility. Thus, initially the input voltage is integrated up starting with the stop impulse 102, up to the end of the supplementary time interval 103, and after the end of the supplementary time interval 103, a shift occurs to integrating down over a reference voltage.

The fine time value thus obtained, which is obtained in case of identity of input voltage and reference voltage, and continuously constant system timing through dividing the two-flank time obtained according to this method by two, does not depend on the value of the selected timing frequency, nor on the selected integration time constant of the capacitor or the RC component.

Figure 3B:
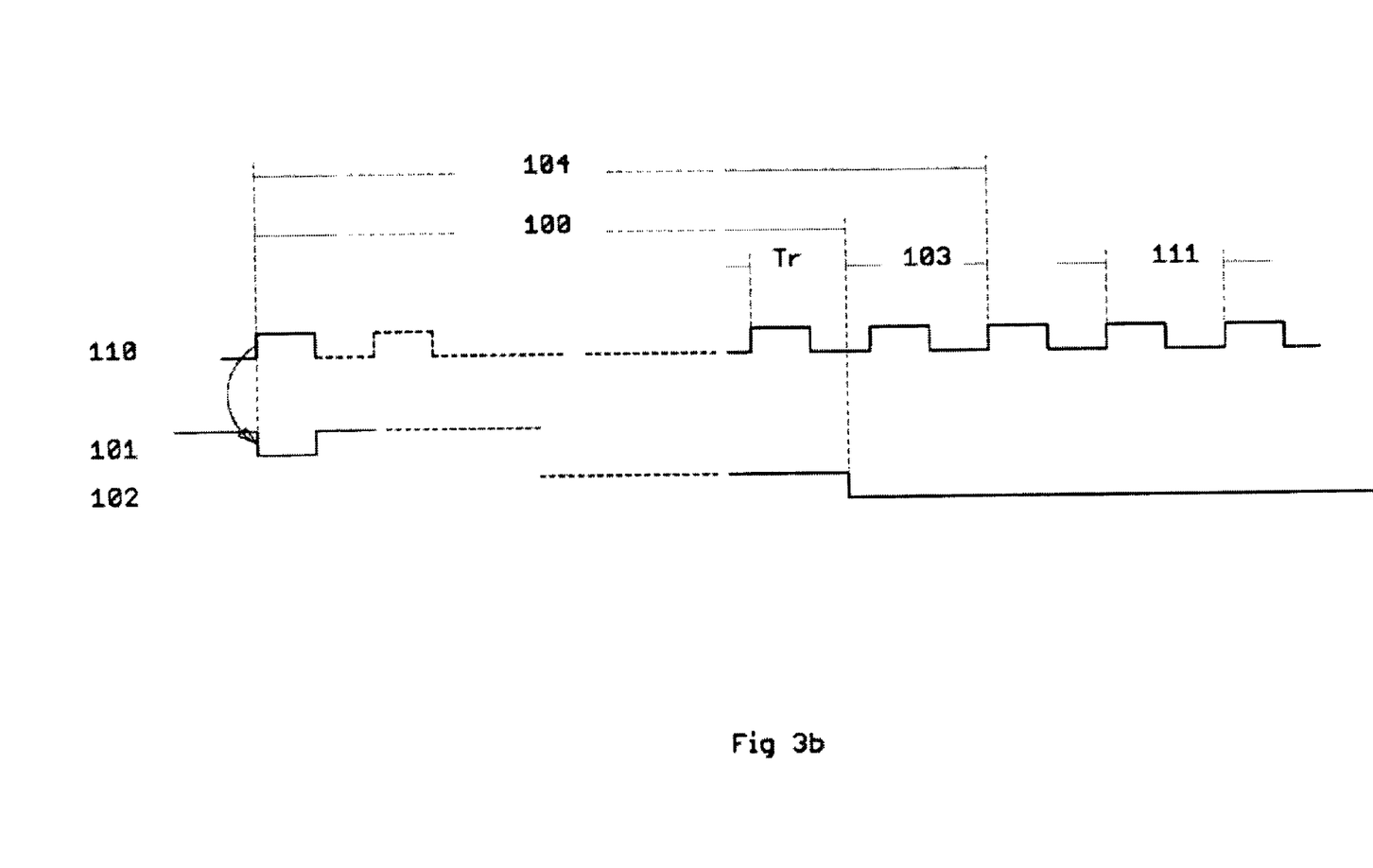
FIG. 3b illustrates the time interval to be measured in an enlarged illustration.

FIG. 2b shows the circuit solution, based on a voltage integration through an RC component, thus a capacitor 13, according to FIGS. 2 through 4.

The arithmetic circuit 26 comprises besides a generator 22 for the start impulse 102 the binary coarse counter 9 for counting the periods 111, elapsing during the coarse time interval 104 of the system timing 110, an analog digital converter 24 for converting the analog fine count value 108 into a digital value, which can be computed with the coarse count value, and a control 25, wherein all of the above are timed by the system timing 10 through the system timing clock 7, which is also included, and all are also connected amongst each other through a data bus.

The control 25 thus includes the digitized values of the coarse counter 9, and also the digitized fine count value from the analog digital converter 24, computes them and puts them out in the form of a standardized position value 112 to the interface 27, putting out the output signal 113. The clock 22 puts out the start impulse 101 from the arithmetic circuit 26 through an electrical conductor 11a onto the wave conductor 2.

The resulting subsequent stop impulse 102, already digitized through the threshold value circuit 42 is provided to the integrator circuit 41 and there initially to NAND gate 21, having another input from the control 25 which possibly includes a calibration signal 114.

The output of the NAND gate 21 is connected with the D-input of a first D-flip-flop 23, on the one hand, and provided through another NAND gate 28 to the integrator 29.

Since the other input of the flip-flop 23 is supplied with the system timing 110, possibly in an inverted manner from a buffer 30, the flip-flop is switched through with the next following positive flank of the system timing 110, and timed through its output to the D-input of a second flip-flop 33, and from there, after a delay of a full period of the system timing 110, timed to its output, since also the second input of this second flip-flop 33 is supplied with the system timing 110.

Thus the output of the second flip-flop constitutes a signal supplement time 115, by which, on the one hand, the coarse counter 9 is supplied, and, on the other hand, the other input of the NAND gate 28, which supplies the integrator 29.

Thus, the integrator 29 was active from the arrival of the stop impulse 102 up to the active flank, after the next of the system timing 110, thus the end of the supplemental time interval 103 and simultaneously of the coarse time interval 104.

The integrator 29 comprises connections 31 and 32, where a high and a low reference voltage is supplied, and which can be supplied through the switches 34, selectively to a RC component 15 and to a capacitor 13 and to a resistor 14, whose integration signal 116 is supplied through an amplifier 16 to the analog digital converter 24.

The integrator 29 can furthermore be supplied through the control 25 with an integrator setback signal 117, in order to reset the initial state of the integrator 29.

What is claimed is:

1. A method for magnetostrictive position determination of a magnetic position indicator (3), along a wave conductor (2), through measurement of a sum (100) of run times of a voltage impulse and of a mechanical-elastic wave (10) resulting there from, wherein the run time sum is determined through:
   providing a system timing (110);
   starting the voltage impulse (start impulse 101) in a fixed phase relationship at the beginning of a period (111) of the system timing (110);
   determining a coarse time value of a coarse time interval (104) through digital determination of an integer number of periods (111) of the system timing (110), which is correlated in a defined manner with the run time sum (100);
   analog determination of a fine time value of a supplemental time interval between arrival of the mechanical-elastic wave (stop impulse 102) and the start of a defined period of the coarse time interval (104);
   digitizing the fine time value; and
   computing the coarse time value with the fine time value into the run-time sum.

2. The method according to claim 1 wherein the system timing (110) is supplied already before supplying the start impulse (101), continuously during the application of the method, and it is in particular already engaged.

3. The method according to claim 1 wherein position of the magnetic position indicator (3) is computed from the run-time sum (100), in consideration of specific velocities of an excitation voltage impulse, and of the mechanical-elastic wave (10) along the wave conductor (2), or in consideration of the specific velocity only of the mechanical-elastic wave (10) along the wave conductor (2).

4. The method according to claim 1 wherein the fine time value corresponds to a supplemental time interval (103) between occurrence of the stop impulse (102) and one of the beginnings of a period of the system timing (110), correlated with end of the coarse time interval.

5. The method according to claim 1 wherein the fine time value supplemental time interval (103) is only determined at the end of run-time sum (100).

6. The method according to claim 1 wherein an analog determination of the fine time value is determined through determination selected from the group consisting of an analogue electric value, an associated electrical voltage value, and two associated electrical voltage values.

7. The method according to claim 1 wherein the fine time value supplemental time interval (103) is determined through interpolation between single or multiple integer of the periods (111') of the system timing (110), in which the fine time interval is located, through integration of a constant value over time between the stop impulse (102) and the end of the coarse time interval (104).

8. The method according to claim 1 wherein an electrical element is used for fine time measurement and is calibrated before each position determination, and calibration time intervals may be used selected from the group consisting of a half period (111'), a period (111) of the system timing (110), and an integer multiple thereof.

9. The method according to claim 8 wherein during integration a charge curve of a capacitor or the RC-component is approximated as a straight line.

10. The method according to claim 8 wherein an integration time constant, the charge time of a capacitor or the RC-component. is selected so that they are identical or greater than a time interval of two periods (111) of the system timing (110).

11. The method according to claim 8 wherein for integrating an RC-component, a constant voltage or a constant current is supplied through a switch.

12. The method according to claim 1 wherein the fine time measurement is also stopped through a same flank (110a) of the system timing (110) through which the counting of the coarse time interval (104) is stopped.

13. The method according to claim 1 wherein for fine time measurement two analog sinusoidal voltages (105a, b) with constant predefined phase position relative to the system timing, and with defined offset from each other are supplied, and the analog voltage values (106a, b) of the two sine voltages (105a, b) are maintained at the time of the stop impulse (102), and the fine time can be derived from their values.

14. The method according to claim 13 wherein a period duration of the sine voltage (105a, b) corresponds to a length of the period (111) of the system timing (110) or to an integer multiple thereof 15. The method according to claim 1 wherein calibration is started with a first flank of a period (111) of the system timing (110) and stopped with a one of a subsequent flank.

16. The method according to claim 1 wherein during integration over the line time value the integration is performed over a value declining from the start value (inverse integration).

17. The method according to claim 1 wherein a frequency of the system timing (110) is selected in the MHz range.

18. A magnetostrictive position sensor (1), said sensor comprising:
   a wave conductor (2);
   a magnetic position indicator (3), movable along the wave conductor (2);
   signal electronics (5) at a measurement location at one end of the wave conductor (2);
   wherein the signal electronics (5) include an excitation circuit (6) and a system timing clock (7); and
   a course counter (9) for determining a coarse time value of a coarse time interval (104) through digital determination of an integer number of periods (111) based on a system timing (110) of the system timing clock (7) and only one interpolator for an analog determination of a fine time value besides the coarse time value measured by the coarse counter (9).

* * * * *